April 1, 1969 — W. L. KAHLOR — 3,436,110
PIPE LAYING TOOL
Filed Feb. 13, 1967

William L. Kahlor
INVENTOR
BY Eugene D. Farley
Atty.

United States Patent Office 3,436,110
Patented Apr. 1, 1969

3,436,110
PIPE LAYING TOOL
William L. Kahlor, Rte. 5, Box 364A,
Oregon City, Oreg. 97045
Filed Feb. 13, 1967, Ser. No. 615,616
Int. Cl. B65g 7/12, 9/00
U.S. Cl. 294—15                    1 Claim

ABSTRACT OF THE DISCLOSURE

A tool for laying short lengths of heavy sewer pipe or the like in connecting engagement with other lengths already in position comprises an elongated lever arm having on one end wheels which track on the upper surface of a laid length of pipe. A hook intermediate the ends of the lever arm engages a second length of pipe and enables lifting it and moving it in an axial direction into coupling engagement with the first length.

---

Figure 1:
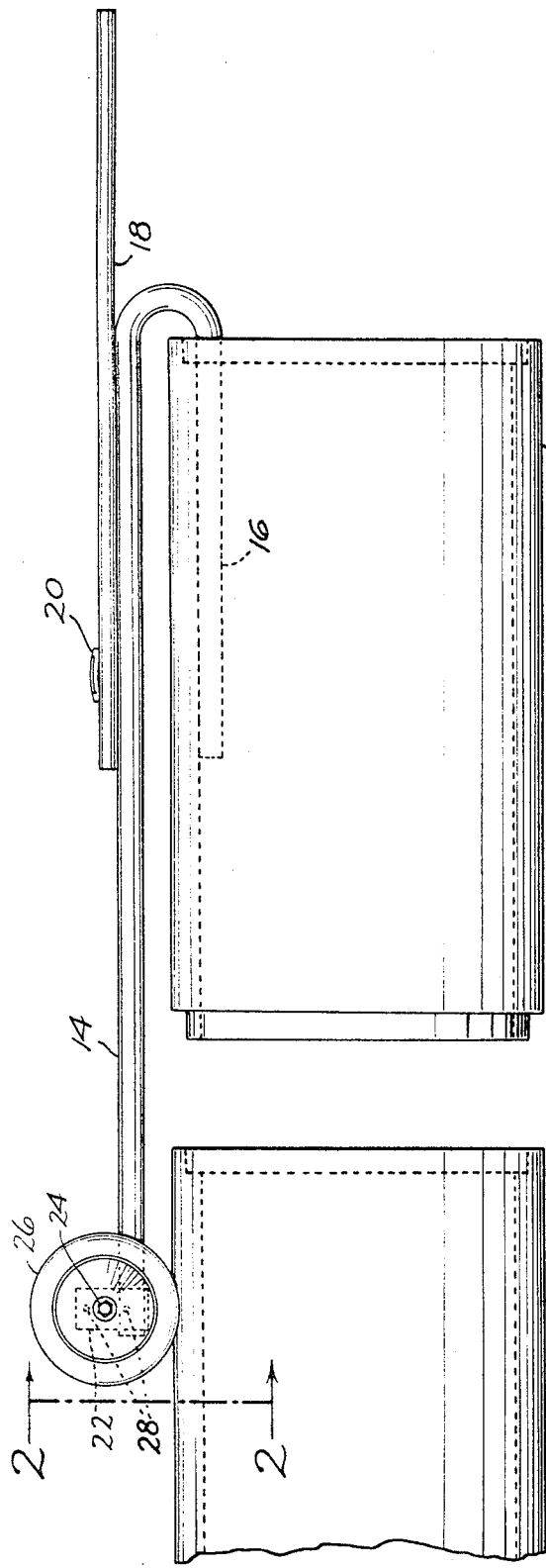

This invention relates to lever type tools for lifting and arranging short, heavy lengths of pipe into coupling engagement with other such lengths.

The manipulation in deep tranches of lengths of concrete culvert and sewer pipe presents a difficult problem. Such pipe is manufactured in short sections of varying diameter which must be aligned and fitted together in coupling engagement. The pipe sections are usually heavy and because of their shape afford little opportunity for the application of conventional tools and jacks, particularly in the confined areas of the trench in which they are to be laid.

It is the general object of the present invention to provide a pipe laying tool useful in the trench-laying of short heavy lengths of pipe rapidly, accurately, safely, without damaging the pipe, and without the use of complicated equipment.

The foregoing basic object of the invention is accomplished by the provision of a pipe laying tool which in essence comprises an elongated lever arm having a pair of wheels rotatably mounted on one of its ends. A hook dimensioned for insertion in a pipe length is secured midway between the ends of the lever. The hook is directed forwardly, with its plane substantially in the planes of the wheels.

To use the tool, the workman places a length of pipe adjacent a length already laid and in rough alignment therewith. He inserts the hook in the bore of the length to be positioned and then places the wheels of the tool on the upper surface of the length already laid. By lifting on the lever he is able to lift the pipe length from the ground and move it forwardly into coupling engagement with the companion length of pipe, the wheels of the tool tracking on the upper surface of the latter during this operation. When the pipe is in position, the tool is removed and applied to the manipulation of another length.

In this manner a single workman, without assistance, is able to lay even heavy pipe rapidly, accurately and safely.

Figure 2:
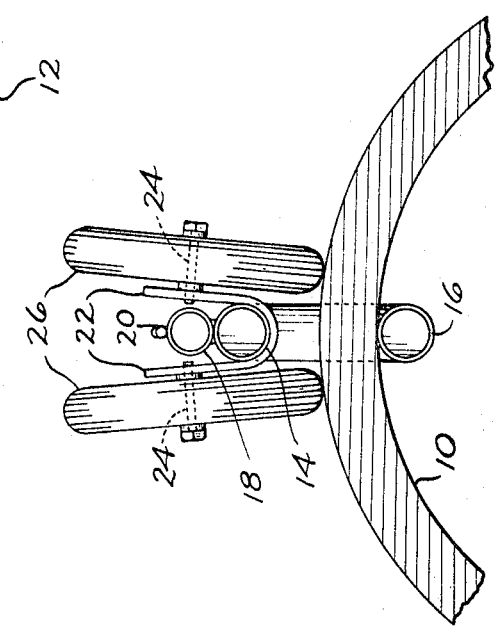

In the drawings:

FIG. 1 is a view in side elevation of the herein described pipe laying tool illustrated in its operative position, applied to the laying of a second length of pipe with respect to a first length already in position; and FIG. 2 is a view in end elevation looking in the direction of the arrows 2—2 of FIG. 1.

The use of the presently described pipe laying tool is illustrated in FIG. 1. A first length 10 of heavy concrete pipe already lies in place in a cut or trench. A second length 12 of the pipe has been placed roughly in position a short distance away from the first length, in end to end relation. The tool of the invention has for its purpose lifting the second length and moving it in an axial direction into coupling engagement with the first length.

The tool designed for this purpose includes an elongated lever arm which in the illustrated form of the invention is formed in two segments. The lower segment 14 comprises a strong bar or length of pipe reversely bent to form a forwardly directed hook 16. The hook is of sufficient length and spacing to be easily insertable in a length of pipe in the manner shown in FIG. 1.

The second segment 18 of the lever arm is welded or otherwise fixed to the first segment in alignment therewith. It forms a handle by means of which the tool is manipulated. A spirit level 20 may be secured to it for use in positioning the pipe.

Wheel means adapted to track on the upper surface of laid length 10 of pipe are suitably mounted on the forward end of the lever arm.

As seen in FIG. 2 the wheel means is mounted on a bar 22 reversely bent into substantially U shape. The bar is welded or otherwise fixed centrally to the end of lever segment 14 to provide a pair of upwardly extending brackets. A pair of axles 24 extend outwardly from the brackets at substantially right angles thereto. Wheels 26 are mounted rotatably on the axles. Openings 28 permit locating the wheels to suit pipe of varying diameter.

It is to be noted that in the foregoing wheel mounting assembly the mounting bar is bent at a reverse angle such that the brackets diverge slightly from each other, by an amount predetermined to locate the planes of wheels 26 substantially normal to the sections of arcuate pipe surface on which they track. This increases the maneuverability of the tool.

To use the tool, the operator inserts hook 16 inside the bore of pipe length 12 and places wheels 26 on the upper surface of pipe length 10. He then lifts on handle 18 to lift length 12.

By pushing forwardly on the handle, he moves the pipe length lengthwise until its leading end is adjacent the trailing end of pipe length 10. Pipe length 12 then easily is manipulated by means of handle 18, lifting or lowering it, working it laterally and advancing and retracting it as necessary to place the two lengths of pipe in coupling engagement. The tool then may be withdrawn until wheels 26 track on the upper surface of the newly laid length of pipe, ready for use in locating a subsequent pipe length.

It accordingly will be seen that there is provided an apparatus in which the several objects of this invention are achieved and which is well adapted for the conditions of practical use.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

1. A tool for laying short, heavy lengths of pipe comprising
   (a) an elongated, U-shaped lever arm having spaced apart end segments one of which is longer than the other,
   (b) a reversely bent bar secured at its closed end to the terminal end of the longer segment of the lever arm with the spaced segments of the bar extending upwardly therefrom,
   (c) a pair of wheels,
   (d) wheel mounting means mounting the wheels rotatably one on each side of the spaced segments of the bar for rotation in an axis substantially normal to the plane of the U-shaped lever arm, (e) the shorter segment of the lever arm being disposed below the longer segment for insertion in a length of pipe to be supported thereby for transport, and (f) a handle member secured rigidly to the lever arm and extending from the closed end of the latter in a direction opposite the terminal ends thereof.

References Cited
UNITED STATES PATENTS

| | | | |
|---|---|---|---|
| 662,342 | 11/1900 | Berry | 294—17 X |
| 2,086,318 | 7/1937 | Jackson | 294—17 |
| 2,538,365 | 1/1951 | Jones | 214—1 |
| 3,350,769 | 11/1967 | Berry | 214—1 |

ANDRES H. NIELSEN, *Primary Examiner.*